United States Patent
Kim et al.

(10) Patent No.: US 9,246,647 B2
(45) Date of Patent: *Jan. 26, 2016

(54) METHOD AND APPARATUS FOR TRANSMITTING AND RECEIVING CONTROL INFORMATION TO RANDOMIZE INTER-CELL INTERFERENCE IN A MOBILE COMMUNICATION SYSTEM

(71) Applicant: Samsung Electronics Co., Ltd., Gyeonggi-do (KR)

(72) Inventors: Young-Bum Kim, Seoul (KR); Joon-Young Cho, Gyeonggi-do (KR); Juho Lee, Gyeonggi-do (KR); Ying Yang Li, Beijing (CN); Yujian Zhang, Beijing (CN)

(73) Assignee: Samsung Electronics Co., Ltd (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/624,251

(22) Filed: Feb. 17, 2015

(65) Prior Publication Data

US 2015/0163005 A1    Jun. 11, 2015

Related U.S. Application Data

(63) Continuation of application No. 14/263,374, filed on Apr. 28, 2014, which is a continuation of application No. 13/543,335, filed on Jul. 6, 2012, now Pat. No. 8,718,005, which is a continuation of application No. 11/970,358, filed on Jan. 7, 2008, now Pat. No. 8,238,320.

(30) Foreign Application Priority Data

| Jan. 5, 2007 | (KR) | ......................... 10-2007-0001329 |
| Jan. 10, 2007 | (KR) | ......................... 10-2007-0003039 |
| May 10, 2007 | (KR) | ......................... 10-2007-0045577 |

(51) Int. Cl.
| H04B 7/208 | (2006.01) |
| H04L 5/00 | (2006.01) |
| H04J 13/00 | (2011.01) |
| H04J 13/18 | (2011.01) |
| H04W 72/04 | (2009.01) |
| H04J 11/00 | (2006.01) |

(Continued)

(52) U.S. Cl.
CPC .............. *H04L 5/0032* (2013.01); *H04B 1/713* (2013.01); *H04J 11/005* (2013.01);
(Continued)

(58) Field of Classification Search
None
See application file for complete search history.

(56) References Cited

U.S. PATENT DOCUMENTS

| 8,238,320 B2* | 8/2012 | Kim | .................... H04J 13/0062 370/344 |
| 8,718,005 B2* | 5/2014 | Kim | .................... H04J 13/0062 370/329 |

(Continued)

FOREIGN PATENT DOCUMENTS

KR    1020050015119    2/2005

OTHER PUBLICATIONS

3rd Generation Partnership Project; Technical Specification Group Radio Access Network; Physical Channels and Modulation (Release 8), 3GPP TS 36.211 V0.2.1, 2006.

(Continued)

*Primary Examiner* — Kouroush Mohebbi
(74) *Attorney, Agent, or Firm* — The Farrell Law Firm, P.C.

(57) ABSTRACT

Methods and apparatuses are provided for transmitting and receiving information. A User Equipment (UE) obtains a sequence based on a Zadoff-Chu sequence and $e^{j\alpha}$, where a cyclic shift value $\alpha$ is defined per Single Carrier-Frequency Division Multiple Access (SC-FDMA) symbol. The UE generates a signal by using information and the sequence. The UE transmits the signal in a SC-FDMA symbol to a Node B.

20 Claims, 18 Drawing Sheets

(51) Int. Cl.
*H04W 28/02* (2009.01)
*H04B 1/713* (2011.01)
*H04L 25/02* (2006.01)

(52) U.S. Cl.
CPC ............ *H04J 13/0062* (2013.01); *H04J 13/18* (2013.01); *H04L 5/0007* (2013.01); *H04L 5/0016* (2013.01); *H04L 5/0019* (2013.01); *H04W 28/0236* (2013.01); *H04W 72/042* (2013.01); *H04W 72/0406* (2013.01); *H04W 72/0413* (2013.01); *H04L 5/0048* (2013.01); *H04L 5/0053* (2013.01); *H04L 25/0228* (2013.01)

(56) References Cited

U.S. PATENT DOCUMENTS

| | | | | |
|---|---|---|---|---|
| 2007/0183386 | A1* | 8/2007 | Muharemovic et al. | 370/344 |
| 2007/0189404 | A1* | 8/2007 | Baum et al. | 375/260 |
| 2007/0230600 | A1* | 10/2007 | Bertrand et al. | 375/260 |
| 2008/0051125 | A1* | 2/2008 | Muharemovic et al. | 455/519 |
| 2008/0205348 | A1* | 8/2008 | Malladi | 370/335 |
| 2008/0273516 | A1* | 11/2008 | Kim et al. | 370/344 |

OTHER PUBLICATIONS

Lucent Technologies: 3GPP TSG-RAN WG1 #47, on Reference Signals for SC-FDMA, Nov. 2006.

Lucent Technologies: 3GPP TSG-RAN WG1 #46bis, on Reference Signal for SC-FDMA, Oct. 2006.

Ericsson: "Uplink Reference Signals", R1-063128, Nov. 6, 2006.

NTT DOCOMO: "Multiplexing Method for Orthogonal Reference Signals for E-UTRA Uplink", 3GPP TSG-RAN WG1 Meeting #45, R1-061193, May 8, 2006.

ETRI: "Cyclic-Shift Hopping for Uplink Sounding Reference Signal", 3GPP TSG-RAN WG1 Meeting #48, R1-070748, Feb. 12, 2007.

* cited by examiner

METHOD AND APPARATUS FOR TRANSMITTING AND RECEIVING CONTROL INFORMATION TO RANDOMIZE INTER-CELL INTERFERENCE IN A MOBILE COMMUNICATION SYSTEM

PRIORITY

This application is a Continuation of U.S. patent application Ser. No. 14/263,374, filed on Apr. 28, 2014, which is a Continuation Application of U.S. patent application Ser. No. 13/543,335, filed on Jul. 6, 2012, now U.S. Pat. No. 8,718, 005, issued on May 6, 2014, which is a Continuation Application of U.S. patent application Ser. No. 11/970,358, filed on Jan. 7, 2008, now U.S. Pat. No. 8,238,320, issued on Aug. 7, 2012, which claims priority to a Korean Patent Application filed in the Korean Intellectual Property Office on Jan. 5, 2007 and assigned Serial No. 10-2007-0001329, a Korean Patent Application filed in the Korean Intellectual Property Office on Jan. 10, 2007 and assigned Serial No. 10-2007-0003039, and a Korean Patent Application filed in the Korean Intellectual Property Office on May 10, 2007 and assigned Serial No. 10-2007-0045577, the entire disclosures of which are incorporated herein by reference.

BACKGROUND OF THE INVENTION

1. Field of the Invention

The present invention generally relates to a mobile communication system. More particularly, the present invention relates to a method and apparatus for transmitting and receiving control information to randomize inter-cell interference caused by UpLink (UL) transmission in a future-generation multi-cell mobile communication system.

2. Description of the Related Art

In the field of mobile communication technologies, recent study in the area of Orthogonal Frequency Division Multiple Access (OFDMA) or Single Carrier-Frequency Division Multiple Access (SC-FDMA) reveals very promising for high-speed transmission on radio channels. The asynchronous cellular mobile communication standardization organization, $3^{rd}$ Generation Partnership Project (3GPP) is working on a future-generation mobile communication system, Long Term Evolution (LTE) in relation to the multiple access scheme.

The LTE system uses a different Transport Format (TP) for UpLink control information depending on data transmission or non-data transmission. When data and control information are transmitted simultaneously on the UL, they are multiplexed by Time Division Multiplexing (TDM). If only control information is transmitted, a particular frequency band is allocated for the control information.

FIG. 1 illustrates a transmission mechanism when only control information is transmitted on the UL in a conventional LTE system. The horizontal axis represents time and the vertical axis represents frequency. One subframe 102 is defined in time and a Transmission (TX) bandwidth 120 is defined in frequency.

Referring to FIG. 1, a basic UL time transmission unit, subframe 102 is 1 ms long and includes two slots 104 and 106 each 0.5 ms long. Each slot 104 or 106 is comprised of a plurality of Long Blocks (LBs) 108 (or long SC-FDMA symbols) and Short Blocks (SBs) 110 (or short SC-FDMA symbols). In the illustrated case of FIG. 1, a slot is configured so as to have six LBs 108 and two SBs 110.

A minimum frequency transmission unit is a frequency tone of an LB and a basic resource allocation unit is a Resource Unit (RU). RUs 112 and 114 each have a plurality of frequency tones, for example, 12 frequency tones form one RU. Frequency diversity can also be achieved by forming an RU with scattered frequency tones, instead of successive frequency tones.

Since LBs 108 and SBs 110 have the same sampling rate, SBs 110 have a frequency tone size twice larger than that of LBs 108. The number of frequency tones allocated to one RU in SBs 110 is half that of frequency tones allocated to one RU in LBs 108. In the illustrated case of FIG. 1, LBs 108 carry control information, while SBs 108 carry a pilot signal (or a Reference Signal (RS)). The pilot signal is a predetermined sequence by which a receiver performs channel estimation for coherent demodulation.

If only control information is transmitted on the UL, it is transmitted in a predetermined frequency band in the LTE system. In FIG. 1, the frequency band is at least one of RUs 112 and 114 at either side of TX bandwidth 120.

In general, the frequency band carrying control information is defined in units of RUs. When a plurality of RUs is required, successive RUs are used to satisfy a single carrier property. Frequency hopping can occur on a slot basis when frequency diversity for one subframe is increased.

In FIG. 1, first control information (Control #1) is transmitted in RU 112 in a first slot 104 and in RU 114 in a second slot 106 by frequency hopping. Meanwhile, second control information (Control #2) is transmitted in RU 114 in first slot 104 and in RU 112 in second slot 106 by frequency hopping.

The control information is, for example, feedback information indicating successful or failed reception of DownLink (DL) data, ACKnowledgment/Negative ACKnowledgment (ACK/NACK) that is generally 1 bit. It is repeated in a plurality of LBs in order to increase reception performance and expand cell coverage. When 1-bit control information is transmitted from different users, Code Division Multiplexing (CDM) can be considered for multiplexing the 1-bit control information. CDM is characterized by robustness against interference, compared to Frequency Division Multiplexing (FDM).

A Zadoff-Chu (ZC) sequence is discussed as a code sequence for CDM-multiplexing of control information. Due to its constant envelop in time and frequency, the ZC sequence offers good Peak-to-Average Power Ratio (PAPR) characteristics and excellent channel estimation performance in frequency. PAPR is the most significant consideration for UL transmission. A higher PAPR leads to a smaller cell coverage, thereby increasing a signal power requirement for a User Equipment (UE). Therefore, efforts should be expanded toward PAPR reduction in UL transmission, first of all.

A ZC sequence with good PAPR characteristics has a circular auto-correlation value of 0 with respect to a non-zero shift. Equation (1) below describes the ZC sequence mathematically.

$$g_p(n) = \begin{cases} e^{-j\frac{2\pi}{N}\frac{pm^2}{2}}, & \text{when } N \text{ is even} \\ e^{-j\frac{2\pi}{N}\frac{pm(n+1)}{2}}, & \text{when } N \text{ is odd} \end{cases} \quad (1)$$

where N is the length of the ZC sequence, p is the index of the ZC sequence, and n denotes the index of a sample of the ZC sequence (n=0, ..., N−1). Because of the condition that p and N should be relatively prime numbers, the number of sequence indexes p varies with the sequence length N. For N=6, p=1,5. Hence, two ZC sequences are generated. If N is a prime number, N−1 sequences are generated.

Two ZC sequences with different p values generated by equation (1) have a complex cross-correlation, of which the absolute value is $1/\sqrt{N}$ and the phase varies with p.

How control information from a user is distinguished from control information from other users by a ZC sequence will be described, by way of example.

Within the same cell, 1-bit control information from different UEs is identified by time-domain cyclic shift values of a ZC sequence. The cyclic shift values are UE-specific to satisfy the condition that they are larger than the maximum transmission delay of a radio transmission path, thus ensuring mutual orthogonality among the UEs. Therefore, the number of UEs that can be accommodated for multiple accesses depends on the length of the ZC sequence and the cyclic shift values. For example, if the ZC sequence is 12 samples long and a minimum cyclic shift value ensuring orthogonality between ZC sequences is 2 samples, multiple accesses is available to six UEs (=12/2).

FIG. 2 illustrates a transmission mechanism in which control information from UEs is CDM-multiplexed.

Referring to FIG. 2, first and second UEs 204 and 206 (UE #1 and UE #2) use the same ZC sequence, ZC #1 in LBs in a cell 202 (Cell A) and cyclically shift ZC #1 by 0 208 and Δ 210 respectively, for user identification. In the illustrated case of FIG. 2, to expand cell coverage, UE #1 and UE #2 each generate a control channel signal by repeating the modulation symbol of intended 1-bit UL control information six times, i.e. in six LBs and multiplying the repeated symbols by the cyclically shifted ZC sequence, ZC #1 in each LB. These control channel signals are kept orthogonal without interference between UE #1 and UE #2 in view of the circular auto-correlation property of the ZC sequence. Δ 210 is set to be larger than the maximum transmission delay of the radio transmission path. Two SBs in each slot carry pilots for coherent demodulation of the control information. For illustrative purposes, only one slot of the control information is shown in FIG. 2.

In a cell 220 (Cell B), third and fourth UEs 222 and 224 (UE #3 and UE #4) use the same ZC sequence, ZC #2 in the LBs and cyclically shift ZC #2 by 0 226 and Δ 228 respectively, for user identification. In view of the circular auto-correlation property of the ZC sequence, control channel signals from UE #3 and UE #4 are kept orthogonal without interference between them.

This control information transmission scheme, however, causes interference between different cells as control channel signals from UEs in the cells use different ZC sequences. In FIG. 2, UE #1 and UE #2 of Cell A use different ZC sequences from those of UE #3 and UE #4 of Cell B. The cross-correlation property of the ZC sequences cause interference among the UEs in proportion to the cross-correlation between the ZC sequences. Accordingly, there exists a need for a method for reducing inter-cell interference caused by control information transmission as described above.

SUMMARY OF THE INVENTION

An aspect of the present invention is to address at least the problems and/or disadvantages and to provide at least the advantages described below. Accordingly, an aspect of the present invention provides a method and apparatus for reducing inter-cell interference when control information from different users is multiplexed in a multi-cell environment.

Another aspect of the present invention provides a method and apparatus for further randomizing inter-cell interference by applying a cell-specific or UE-specific random sequence to control information in a subframe.

A further aspect of the present invention provides a method and apparatus for notifying a UE of a random sequence applied to control information in a subframe by Layer 1/Layer 2 (L1/L2) signaling.

Still another aspect of the present invention provides a method and apparatus for effectively receiving control information in a subframe without inter-cell interference.

In accordance with an aspect of the present invention, a method is provided for transmitting information. A UE obtains a sequence based on a Zadoff-Chu sequence and $e^{j\alpha}$, where a cyclic shift value α is defined per SC-FDMA symbol. The UE generates a signal by using information and the sequence. The UE transmits the signal in a SC-FDMA symbol to a Node B.

In accordance with another aspect of the present invention, a method is provided for receiving information. A Node B receives a signal in a SC-FDMA symbol from a UE. The Node B determines a Zadoff-Chu sequence and $e^{j\alpha}$, where a cyclic shift value α is defined per SC-FDMA symbol. The Node B obtains a sequence based on the Zadoff-Chu sequence, $e^{j\alpha}$, and the cyclic shift value α. The Node B obtains the signal using the sequence.

In accordance with a further aspect of the present invention, an apparatus is provided for transmitting information. The apparatus includes a controller configured to obtain a sequence based on a Zadoff-Chu sequence and $e^{j\alpha}$, where a cyclic shift value α is defined per SC-FDMA symbol, and to generate a signal by using information and the sequence. The apparatus also includes a transceiver configured to transmit signal in a SC-FDMA symbol to a Node B.

In accordance with still another aspect of the present invention, an apparatus is provided for receiving information. The apparatus includes a transceiver configured to receive a signal in a SC-FDMA symbol from a UE. The apparatus also includes a controller configured to determine a Zadoff-Chu sequence and $e^{j\alpha}$, where a cyclic shift value α is defined per SC-FDMA symbol, to obtain a sequence based on the Zadoff-Chu sequence, $e^{j\alpha}$, and the cyclic shift value α, and to obtain the signal using the sequence.

BRIEF DESCRIPTION OF THE DRAWINGS

The above and other objects, features and advantages of certain exemplary embodiments of the present invention will be more apparent from the following detailed description taken in conjunction with the accompanying drawings, in which.

Throughout the drawings, the same drawing reference numerals will be understood to refer to the same elements, features and structures.

DETAILED DESCRIPTION OF EMBODIMENTS OF THE PRESENT INVENTION

Figure 1:
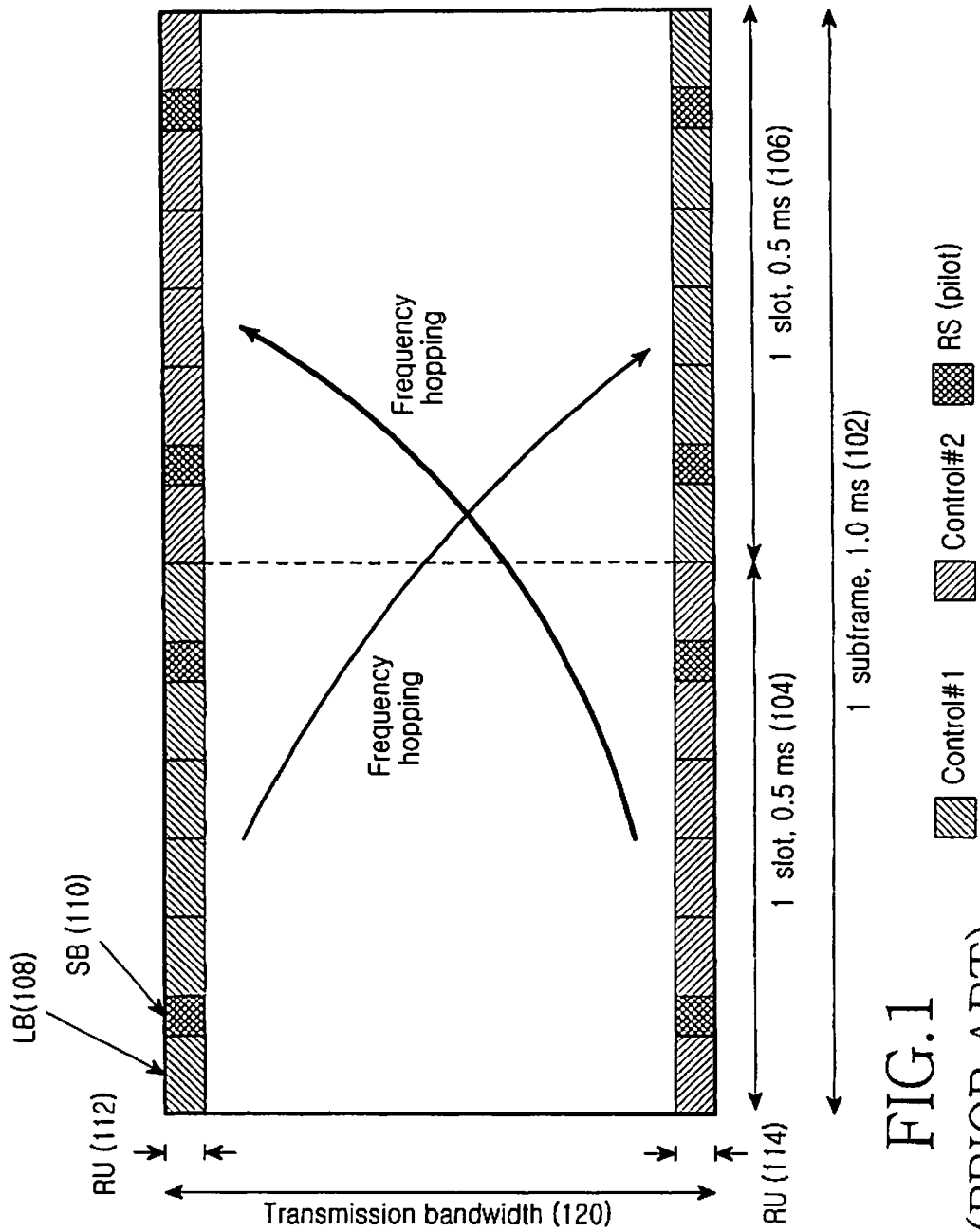
FIG. 1 illustrates a transmission mechanism for control information in a conventional LTE system.
Figure 2:
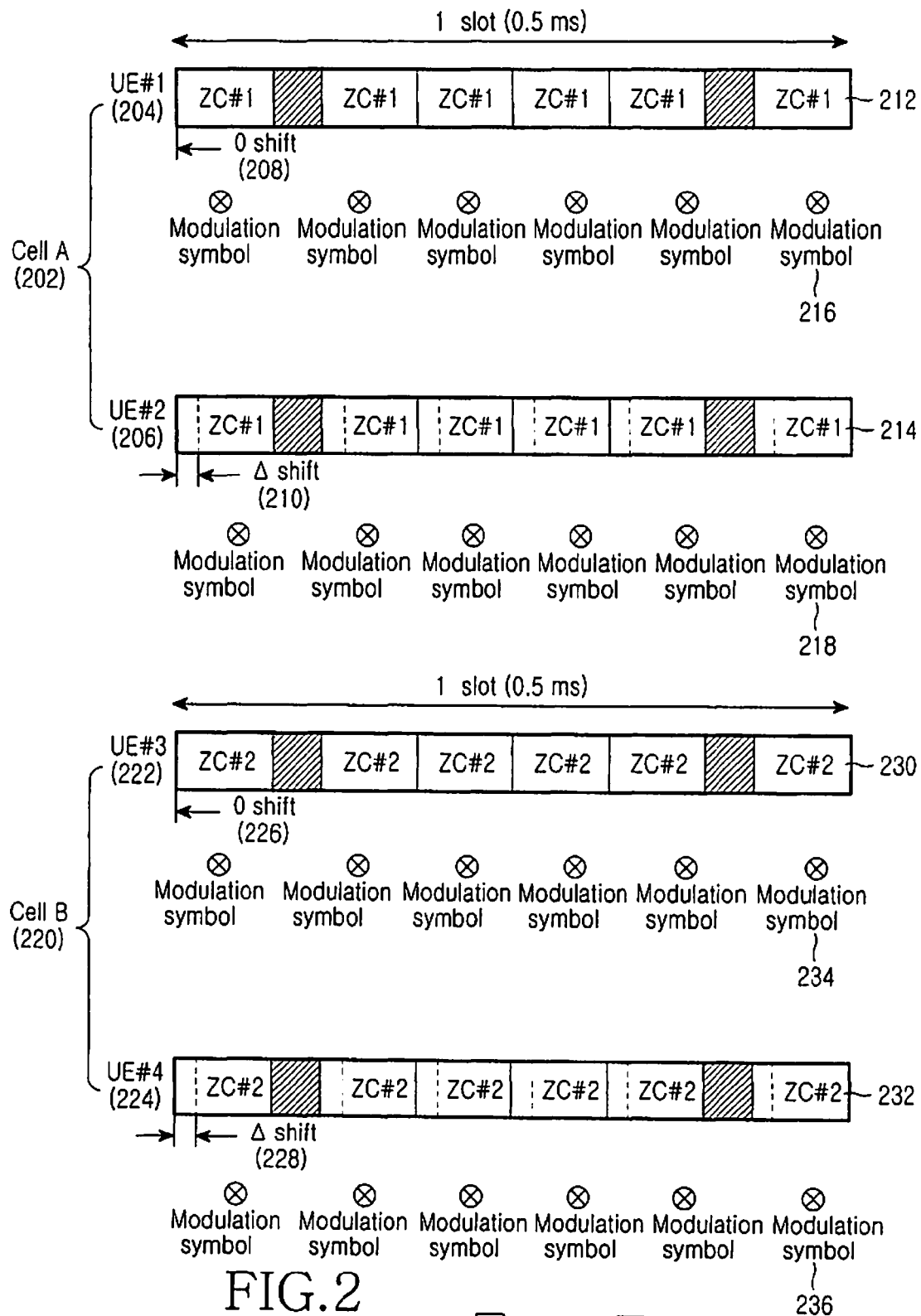
FIG. 2 illustrates a transmission mechanism in which control information from UEs is CDM-multiplex.

Embodiments of the present invention are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present invention.

Embodiments of the present invention provide transmission and reception operations of a UE and a Node B in the case where UL control information from a plurality of UEs are multiplexed over a predetermined frequency area of a system frequency band.

The present invention will be described in the context of CDM transmission of control information from a plurality of UEs in an SC-FDMA cellular communication system. Yet, the present invention is also applicable to multiplexing that does not share particular time-frequency resources, for example, FDM or TDM transmission of the control information. CDM can be one of various CDMA schemes including time-domain CDMA and frequency-domain CDM.

For CDM, a ZC sequence is used, while any other code sequence with similar characteristics is available. The control information is 1-bit control information such as ACK/NACK. However, an inter-cell interference reduction method of the present invention is also applicable to control information with a plurality of bits such as a Channel Quality Indicator (CQI). In this case, each bit of the control information is transmitted in one SC-FDMA symbol. The inter-cell interference reduction method is also applicable to CDM transmission of different types of control information, for example, 1-bit control information and control information with a plurality of bits.

Inter-cell interference occurs when UEs in adjacent cells transmit their control information using different ZC sequences of length N in M SC-FDMA symbols, i.e. M LBs being UL time transmission units.

If the phases of the correlations between sequences in LBs from UEs within adjacent cells are randomized while the circular auto-correlation and cross-correlation properties of the ZC sequence are maintained, the phase of interference between the adjacent cells is randomized across the LBs during accumulation of the LBs carrying the control information for a subframe at a receiver, thus decreasing the average interference power.

In accordance with an exemplary embodiment of the present invention, each UE generates its ZC sequence on an LB basis in a subframe and applies a random sequence having a random phase or a random cyclic shift value to the ZC sequence in each LB, thereby randomizing the ZC sequence. Then the UE transmits control information by the randomized ZC sequence. The random sequence is cell-specific. The interference randomization is further increased by use of a different random sequence of phase values or cyclic shift values for each UE.

The present invention puts forth the following three methods. In the following description, a ZC sequence of length N is denoted by $g_p(n)$. The ZC sequence $g_p(n)$ is randomized over M LBs and control information is multiplied by the randomized ZC sequence $g'_{p,m,k}(n)$ where k denotes the index of a channel carrying the control information.

Equation (2) describes the randomized ZC sequence according to Method 1.

$$g'_{p,m,k}(n) = g_p((n+d_k) \bmod N) \cdot S_{M,m}, (m=1,2,\ldots,M, n=0,1,2,\ldots,N-1) \quad (2)$$

where $d_k$ denotes a cyclic shift value of the same ZC sequence, by which channel k carrying the control information is identified. The cyclic shift value is preferably a time-domain cyclic shift value although it can be a frequency-domain cyclic shift value. In equation (2), mod represents modulo operation. For instance, A mod B represents the remainder of dividing A by B.

$S_{M,m}$ is an orthogonal code of length M, being +1s or −1s. This orthogonal code can be a Walsh code where m denotes the index of an LB to which the control information is mapped. If the control information is repeated four times in the slots of a subframe, the chips of a Walsh sequence of length 4 are multiplied one to one by the LBs of each slot, and a combination of Walsh sequences for two slots in the subframe is different for each cell, thus randomizing inter-cell interference. For additional randomization, a different combination of Walsh sequences can be used for each UE.

Equation (3) describes the randomized ZC sequence according to Method 2.

$$g'_{p,m,k}(n) = g_p((n+d_k) \bmod N) \cdot e^{j\phi_n}, (m=1,2,\ldots,M, n=0, 1,2,\ldots,N-1) \quad (3)$$

where $\phi_m$ denotes a random phase value that changes the phase of the ZC sequence $g_p(n)$ in each LB. Inter-cell interference is randomized by using different sets of random phase values, i.e. different random phase sequences $\{\phi_m\}$ for adjacent cells in LBs of a subframe.

Equation (4) describes the randomized ZC sequence according to Method 3.

$$g'_{p,m,k}(n) = g_p((n+d_k+\Delta_m) \bmod N), (m=1,2,\ldots,M, n=0, 1,2,\ldots,N-1) \quad (4)$$

where $\Delta_m$ denotes a random cyclic shift value that changes the time-domain cyclic shift value $d_k$ of the ZC sequence $g_p(n)$ in each LB. Inter-cell interference is randomized by using different sets of random time-domain cyclic shift values, i.e. different random time-domain cyclic shift sequences $\{\Delta_m\}$ for adjacent cells in LBs of in a subframe. While the random cyclic shift values are used in the time domain herein, they can be adapted to be used in the frequency domain.

Figure 3:
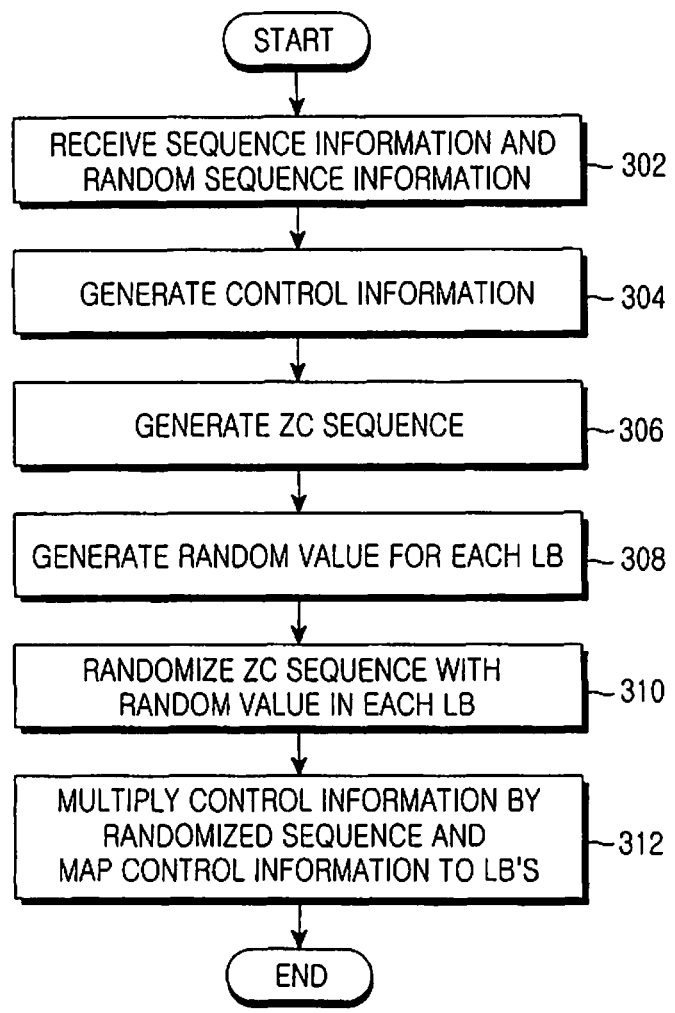
FIG. 3 is a flowchart of an operation for transmitting control information in a UE according to the present invention.

Referring to FIG. 3, a UE receives sequence information and random sequence information from a Node B by signaling in step 302. The sequence information is about a ZC sequence for use in transmitting control information, including the index of the ZC sequence and a cyclic shift value, and the random sequence information is used for randomizing the ZC sequence, including a random phase sequence being a set of random phase values or a random time-domain cyclic shift sequence being a set of random time-domain cyclic shift values, for application to LBs of a subframe. The signaling is upper-layer (e.g. L2) signaling or physical layer (L1) signaling. To randomize inter-cell interference, the random phase sequence or the random time-domain cyclic shift sequence is different for each cell. For further interference randomization, the random phase sequence or the random time-domain cyclic shift sequence can also be set to be different for each UE.

In step 304, the UE generates control information and generates complex-valued modulation symbols (hereinafter, control symbols) using the control information. The number of the control symbols is equal to that of LBs allocated for transmission of the control information. For example, if the control information is 1 bit, the UE creates as many control symbols as the number of the allocated LBs by repetition.

In step 306, the UE generates the ZC sequence using the index and the cyclic shift value included in the sequence information. The UE then generates random values according to the random phase sequence or the random time-domain cyclic shift sequence included in the random sequence information in step 308. The random values are a Walsh sequence, random phase values, or random time-domain cyclic shift values. These random values are different for each cell and/or each UE. The UE generates a randomized ZC sequence by applying the random values to the ZC sequence on an LB basis in step 310. In step 312, the UE multiplies the randomized ZC sequence by the control symbols, maps the products to the LBs, and transmits the mapped LBs.

Figure 4:
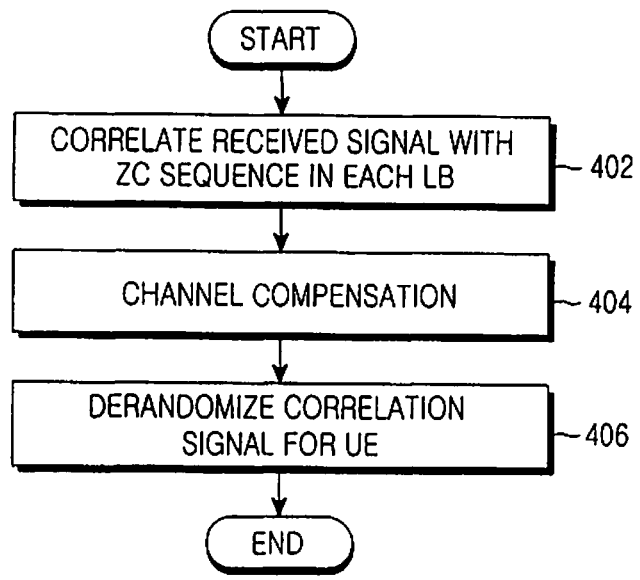
FIG. 4 is a flowchart of an operation for receiving control information in a Node B according to the present invention.

Referring to FIG. 4, the Node B acquires a correlation signal by correlating a signal received from an intended UE in a plurality of LBs with a ZC sequence applied to the signal in step 402. In step 404, the Node B performs channel estimation on a pilot signal received from the UE and performs channel compensation for the correlation signal using the channel estimate. The Node B acquires control information by applying random values corresponding to the UE to the channel-compensated correlation signal on an LB basis and thus removing random values from the channel-compensated correlation signal in step 406. The random values corresponding to the UE are known from random sequence information that the Node B transmitted to the UE.

In the above transmission and reception of control information, an LB (i.e. an SC-FDMA symbol) is a basic unit to which the control information is mapped for transmission. The ZC sequence is repeated in units of LBs and the elements of the random phase sequence or the random time-domain cyclic shift sequence change LB by LB.

In the case where a plurality of cells exist under the same Node B, UEs within each cell multiplex their control channels using the same ZC sequence and different time-domain cyclic shift values. If different random phase sequences or random time-domain cyclic shift sequences are used on an LB basis in the cells of the Node B, orthogonality may be lost among UEs. Under this environment, therefore, a random phase sequence or a random time-domain cyclic shift sequence is specific to the Node B and the cells of the Node B use the same random sequence.

Embodiment 1

The first exemplary embodiment of the present invention implements Method 1 described in Equation (2).

Figure 5:
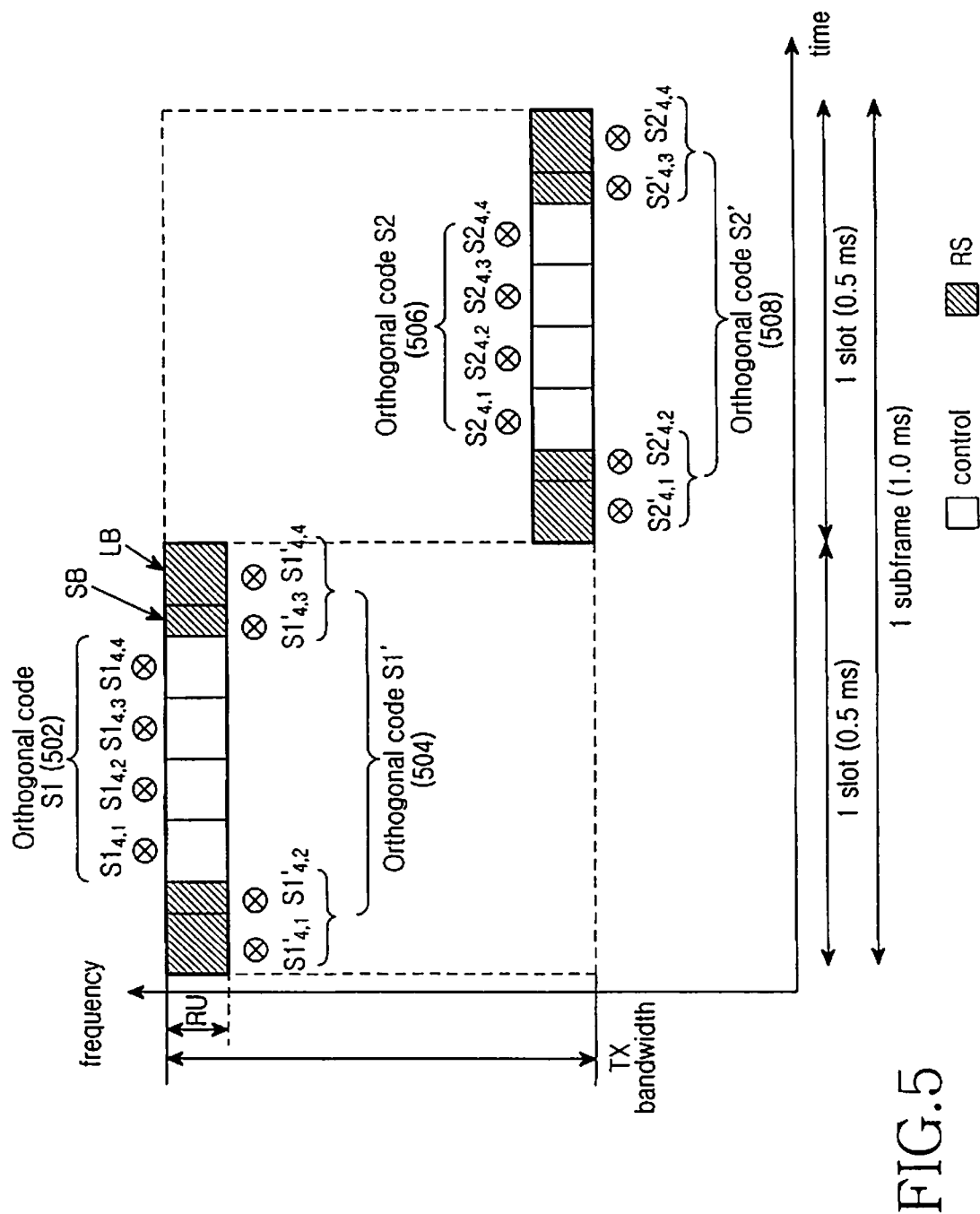
FIG. 5 illustrates a transmission mechanism for control information according to the present invention.

Referring to FIG. 5, the same 1-bit control information occurs 8 times in one subframe and is subject to frequency hopping on a slot basis in order to achieve frequency diversity. If two SBs and the first and last LBs carry pilots for channel estimation in each slot, the remaining LBs of the slot can be used for transmitting the control information. While one RU is used for transmitting the control information herein, a plurality of RUs can be used to support a plurality of users.

In a first slot, modulation symbols carrying the 1-bit control information occur four times, for transmission in four LBs and are multiplied by an orthogonal code of length 4, (S1 502 (=$S1_{4,1}$ $S1_{4,2}$ $S1_{4,3}$ $S1_{4,4}$)) on an LB basis. $S1_{4,x}$ represents chip x of the orthogonal code S1. The pilot sequence is also multiplied by an orthogonal code of length 4, (S1' 504 (=$S1'_{4,1}$ $S1'_{4,2}$ $S1'_{4,3}$ $S1'_{4,4}$)) on an LB or SB basis. The use of orthogonal codes can increase the number of multiple-access users. For example, for length 4, four orthogonal codes are available. The use of the four orthogonal codes enable four times more users to be accommodated in the same time-frequency resources, as compared to non-use of orthogonal codes.

In a second slot, the 1-bit control information occurs four times and is multiplied by an orthogonal code of length 4, [S2 506 (=$S2_{4,1}$ $S2_{4,2}$ $S2_{4,3}$ $S2_{4,4}$)] on an LB basis. The pilot sequence is also multiplied by an orthogonal code of length 4, (S2' 508 (=$S2'_{4,1}$ $S2'_{4,2}$ $S2'_{4,3}$ $S2'_{4,4}$)) on an LB or SB basis.

The Node B signals orthogonal codes S1 502, S1' 504, S2 506, and S2' 508 to the UE. Due to the nature of the orthogonal codes, their lengths should be multiples of 4. In FIG. 5, orthogonal codes of length 4 are applied to each slot. If frequency hopping does not take place on a slot basis in the transmission mechanism of FIG. 5, the control information may experience a negligibly small channel change in frequency during one-subframe transmission. Therefore, orthogonality is still maintained even though the length of the orthogonal codes is extended to one subframe. In this case, orthogonal codes of length 8 can be used for transmitting the control information in one subframe.

A different combination of orthogonal codes to be applied to the slots of one subframe is set for each cell to randomize inter-cell interference. For example, for transmitting control information in the slots, Cell A uses orthogonal codes {S1, S2} sequentially and Cell B uses orthogonal codes {S3, S4} sequentially. The orthogonal code combination {S3,S4} includes at least one different orthogonal code from the orthogonal code combination {S1,S2}.

Figure 6A:
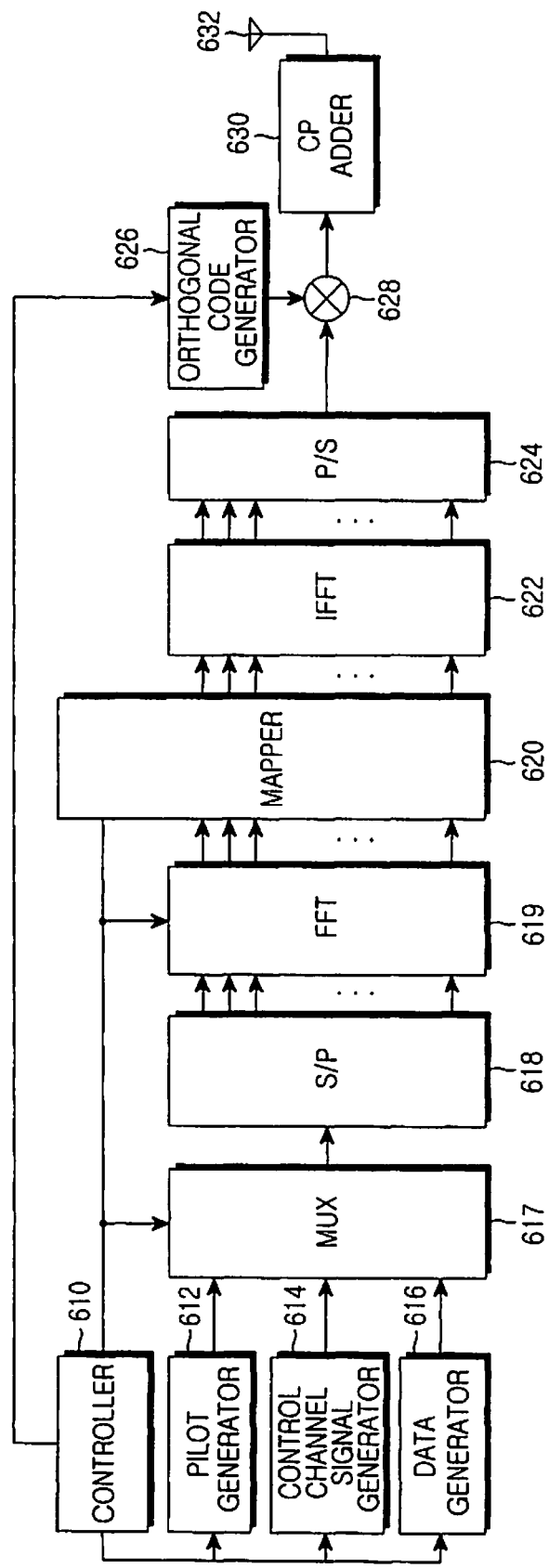
FIGS. 6A and 6B are block diagrams of a transmitter in the UE according to the present invention.

Referring to FIG. 6A, the transmitter includes a controller 610, a pilot generator 612, a control channel signal generator 614, a data generator 616, a Multiplexer (MUX) 617, a Serial-to-Parallel (S/P) converter 618, a Fast Fourier Transform (FFT) processor 619, a mapper 620, an Inverse Fast Fourier Transform (IFFT) 622, a Parallel-to-Serial (P/S) converter 624, an orthogonal code generator 626, a multiplier 628, a Cyclic Prefix (CP) adder 630, and an antenna 632. Components and an operation related to UL data transmission are well known in the art and therefore, will not be described herein.

Controller 610 provides overall control to the operation of the transmitter and generates control signals required for MUX 617, FFT processor 619, mapper 620, pilot generator 612, control channel signal generator 614, data generator 616, and orthogonal code generator 626. The control signal provided to pilot generator 612 indicates a sequence index and a time-domain cyclic shift value by which to generate a pilot sequence. Control signals associated with UL control information and data transmission are provided to control channel signal generator 614 and data generator 616.

MUX 617 multiplexes a pilot signal, a data signal, and a control channel signal received from pilot generator 612, data generator 616, and control channel signal generator 614 according to timing information indicated by a control signal received from controller 610, for transmission in an LB or an SB. Mapper 620 maps the multiplexed signal to frequency resources according to LB/SB timing information and frequency allocation information received from controller 610.

When only control information is transmitted without data, orthogonal code generator 626 generates orthogonal codes for LBs/SBs according to information about cell-specific or UE-specific orthogonal codes to be used for slots, received from controller 610, and applies the chips of the orthogonal codes to the control symbols of the control channel signal mapped to LBs according to timing information received from controller 610. The orthogonal code information is provided to controller 610 by Node B signaling.

S/P converter 618 converts the multiplexed signal from MUX 617 to parallel signals and provides them to FFT processor 619. The input/output size of FFT processor 619 varies according to a control signal received from controller 610. Mapper 620 maps FFT signals from FFT processor 619 to frequency resources. IFFT processor 622 converts the mapped frequency signals to time signals and P/S converter 624 serializes the time signals. Multiplier 628 multiplies the serial time signal by the orthogonal codes generated from orthogonal code generator 626. That is, orthogonal code generator 626 generates orthogonal codes to be applied to the slots of a subframe that will carry the control information according to the timing information received from controller 610.

CP adder 630 adds a CP to the signal received from multiplier 628 to avoid inter-symbol interference and transmits the CP-added signal through transmit antenna 632.

Figure 6B:
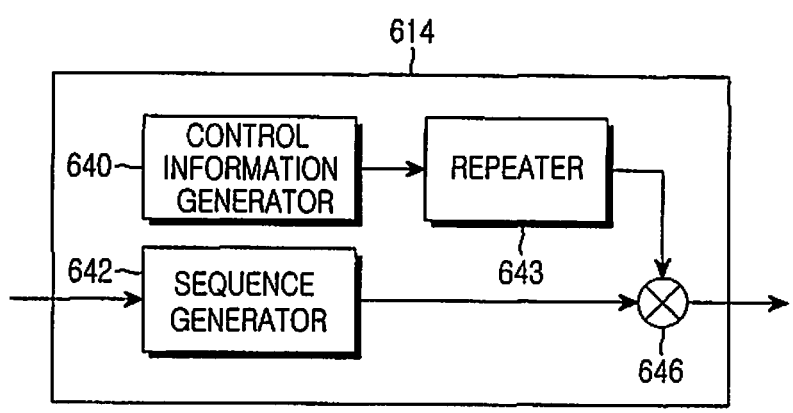

Referring to FIG. 6B, a sequence generator 642 of control channel signal generator 614 generates a code sequence, for example, a ZC sequence on an LB basis. To do so, sequence generator 642 receives sequence information such as a sequence length and a sequence index from controller 610. The sequence information is known to both the Node B and the UE.

A control information generator 640 generates a modulation symbol having 1-bit control information and a repeater 643 repeats the control symbol to produce as many control symbols as the number of LBs allocated to the control information. A multiplier 646 CDM-multiplexes the control symbols by multiplying the control symbols by the ZC sequence on an LB basis, thus producing a control channel signal.

The multiplier 646 functions to generate the user-multiplexed control channel signal by multiplying the symbols output from the repeater 643 by the ZC sequence. A modified embodiment of the present invention can be contemplated by replacing the multiplier 646 with an equivalent device.

Figure 7A:
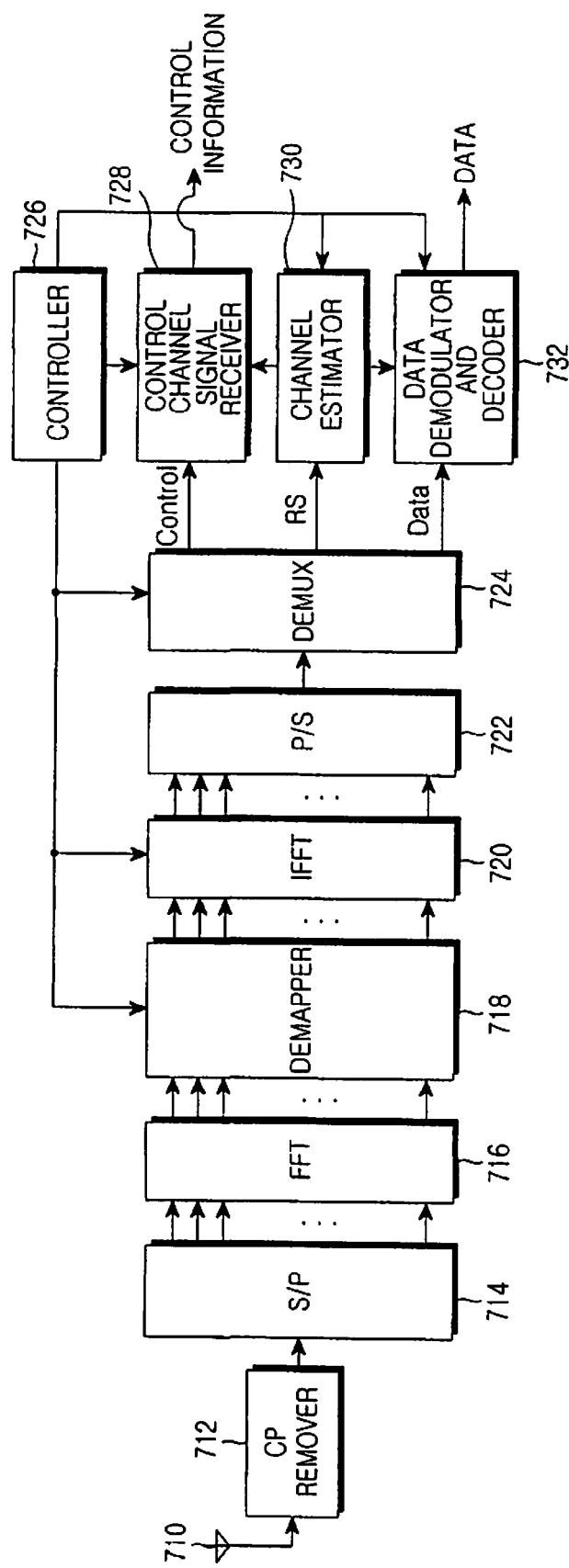
FIGS. 7A and 7B are block diagrams of a receiver in the Node B according to the present invention.

Referring to FIG. 7A, the receiver includes an antenna 710, a CP remover 712, an S/P converter 714, an FFT processor 716, a demapper 718, an IFFT processor 720, a P/S converter 722, a Demultiplexer (DEMUX) 724, a controller 726, a control channel signal receiver 728, a channel estimator 730, and a data demodulator and decoder 732. Components and an operation associated with UL data reception are well known in the art and therefore, will not be described herein.

Controller 726 provides overall control to the operation of the receiver. It also generates control signals required for DEMUX 724, IFFT processor 720, demapper 718, control channel signal receiver 728, channel estimator 730, and data demodulator and decoder 732. Control signals related to UL control information and data are provided to control channel signal receiver 728 and data demodulator and decoder 732. A control channel signal indicating a sequence index and a time-domain cyclic shift value is provided to channel estimator 730. The sequence index and the time-domain cyclic shift value are used to generate a pilot sequence allocated to the UE.

DEMUX 724 demultiplexes a signal received from P/S converter 722 into a control channel signal, a data signal, and a pilot signal according to timing information received from controller 726. Demapper 718 extracts those signals from frequency resources according to LB/SB timing information and frequency allocation information received from controller 726.

Upon receipt of a signal including control information from the UE through antenna 710, CP remover 712 removes a CP from the received signal. S/P converter 714 converts the CP-free signal to parallel signals and FFT processor 716 processes the parallel signals by FFT. After demapping in demapper 718, the FFT signals are converted to time signals in IFFT processor 720. The input/output size of IFFT processor 720 varies according to the control signal received form controller 726. P/S converter 722 serializes the IFFT signals and DEMUX 724 demultiplexes the serial signal into the control channel signal, the pilot signal, and the data signal.

Channel estimator 730 acquires a channel estimate from the pilot signal received from DEMUX 724. Control channel signal receiver 728 channel-compensates the control channel signal received from DEMUX 724 by the channel estimate and acquires control information transmitted by the UE. Data demodulator and decoder 732 channel-compensates the data signal received from DEMUX 724 by the channel estimate and then acquires data transmitted by the UE based on the control information.

When only control information is transmitted without data on the UL, control channel signal receiver 728 acquires the control information in the manner described with reference to FIG. 5.

Figure 7B:
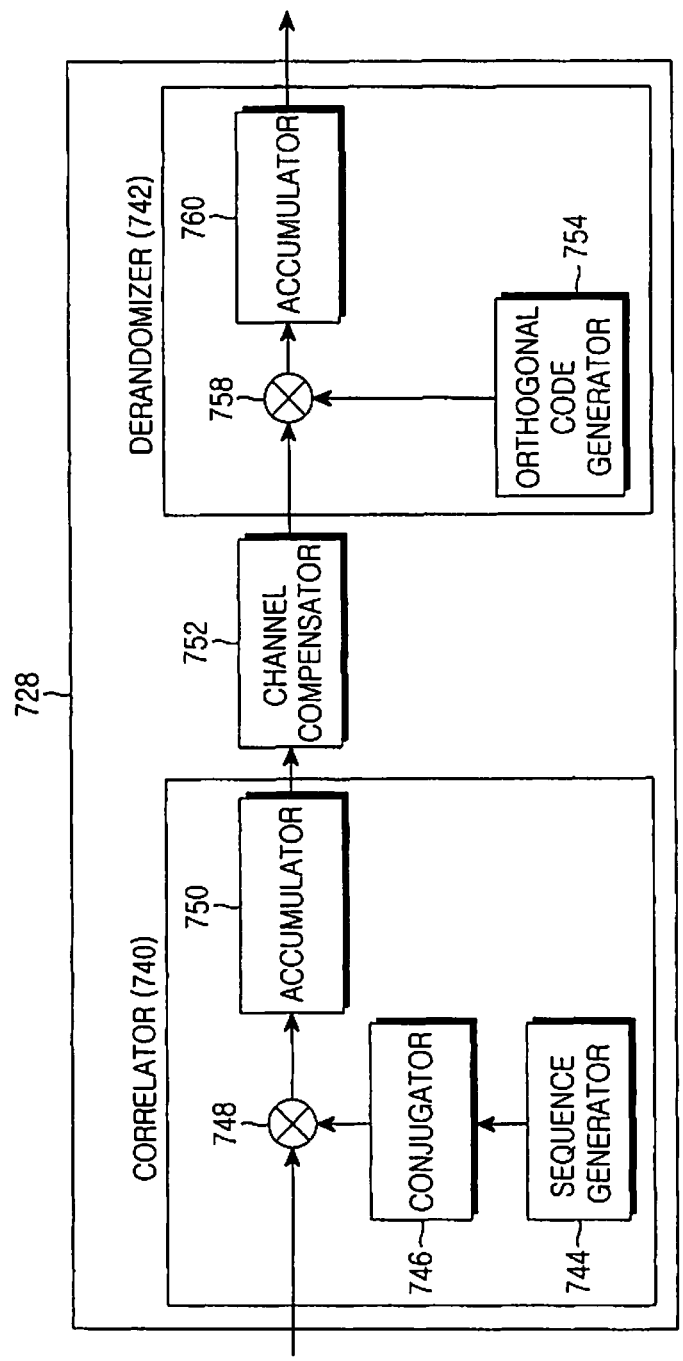

Referring to FIG. 7B, control channel signal receiver 728 includes a correlator 740 and a derandomizer 742. A sequence generator 744 of correlator 740 generates a code sequence, for example, a ZC sequence used for the UE to generate 1-bit control information. To do so, sequence generator 744 receives sequence information indicating a sequence length and a sequence index from controller 726. The sequence information is known to both the Node B and the UE.

A conjugator 746 calculates the conjugate consequence of the ZC sequence. A multiplier 748 CDM-demultiplexes the control channel signal received from DEMUX 724 by multiplying the control channel signal by the conjugate sequence on an LB basis. An accumulator 750 accumulates the signal received from multiplier 748 for the length of the ZC sequence. A channel compensator 752 channel-compensates the accumulated signal by the channel estimate received from channel estimator 730.

In derandomizer 742, an orthogonal code generator 754 generates orthogonal codes by which the UE uses in transmitting the 1-bit control information, according to orthogonal code information. A multiplier 758 multiplies the channel-compensated signal by the chips of the orthogonal sequences on an LB basis. An accumulator 760 accumulates the signal received from multiplier 758 for the number of LBs to which the 1-bit control information was repeatedly mapped, thereby acquiring the 1-bit control information. The orthogonal code information is signaled from the Node B to the UE so that both the Node B and the UE are aware of the orthogonal code information.

In a modified embodiment of the present invention, channel compensator 752 is disposed between multiplier 758 and accumulator 760. While correlator 740 and derandomizer 742 are separately configured in FIG. 7B, sequence generator 744 of correlator 740 and orthogonal code generator 754 of derandomizer 742 can be incorporated into a single device depending on a configuration method. For example, if correlator 740 is configured so that sequence generator 744 generates a ZC sequence with an orthogonal code applied on an LB basis for each UE, multiplier 758 and orthogonal code generator 754 of derandomizer 742 are not used. Thus, a device equivalent to that illustrated in FIG. 7B is achieved.

Embodiment 2

The second exemplary embodiment of the present invention implements Method 2 described in Equation (3).

Figure 8:
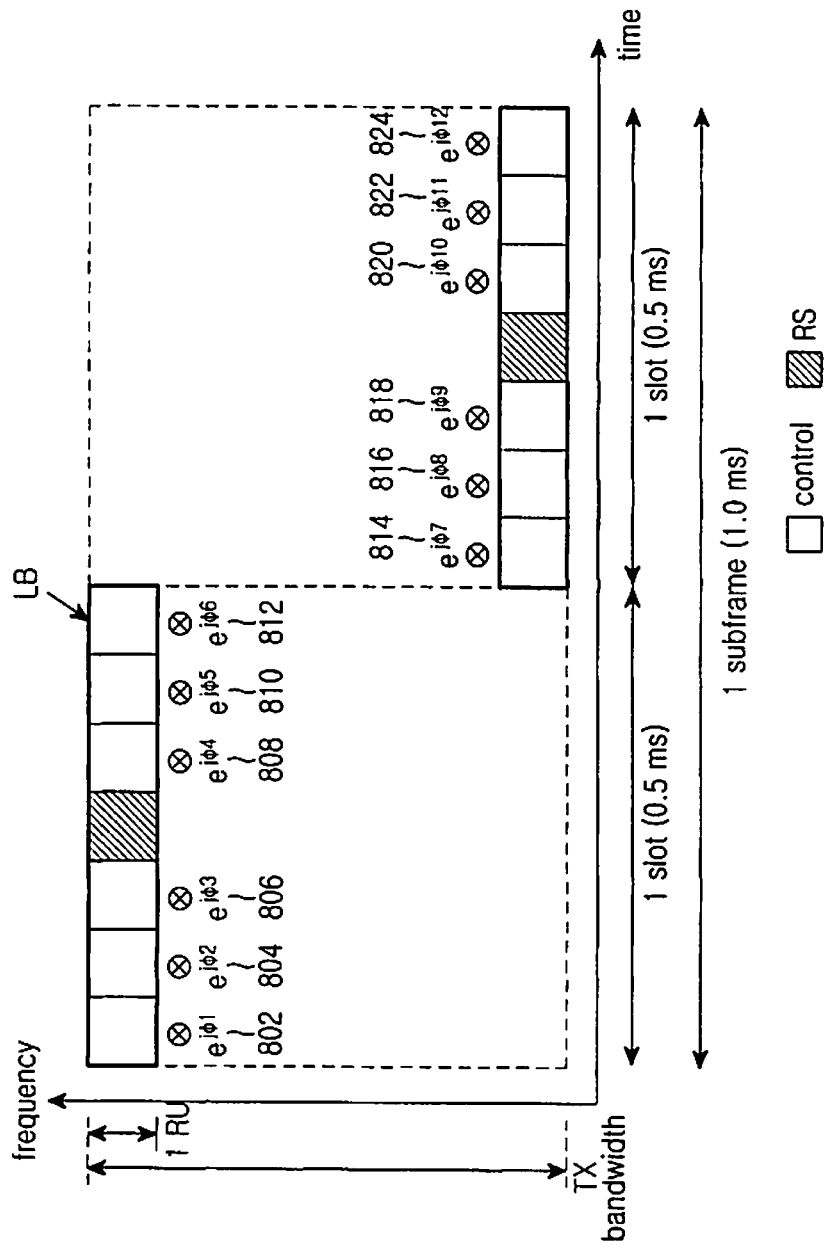
FIG. 8 illustrates a transmission mechanism for control information according to the present invention.

Referring to FIG. 8, one slot includes a total of 7 LBs and the fourth LB carries a pilot signal in each slot. Hence, one subframe has 14 LBs in total, and 2 LBs are used for pilot transmission and 12 LBs for control information transmission. While one RU is used for transmitting control information herein, a plurality of RUs can be used to support a plurality of users.

The same 1-bit control information occurs 6 times in each slot, thus 12 times in one subframe. For frequency diversity, frequency hopping is performed for the control information on a slot basis. A random phase is applied to a ZC sequence in each LB carrying the control information. The resulting randomization of the ZC sequence randomizes inter-cell interference.

Random phase values applied to the ZC sequence in LBs are $\phi_1, \phi_2, \ldots, \phi_{12}$ 802 to 824. The ZC sequence is multiplied by $e^{j\Phi_m}$ (m=1, 2, . . . , 12), thus being phase-rotated. As a random phase sequence, being a set of random phase values for LBs is cell-specific; hence, the inter-cell interference is randomized. That is, since the correlation between randomized ZC sequences used for LBs of different cells is randomly phase-rotated over one subframe, interference between control channels from the cells is reduced.

The Node B signals the random phase sequence to the UE so that both are aware of the random phase sequence. To reduce the inter-cell interference, a cell-specific random phase value can also be applied to the pilot signal. The Node B signals the random phase value to the UE so that both are aware of the random phase sequence.

Figure 9:
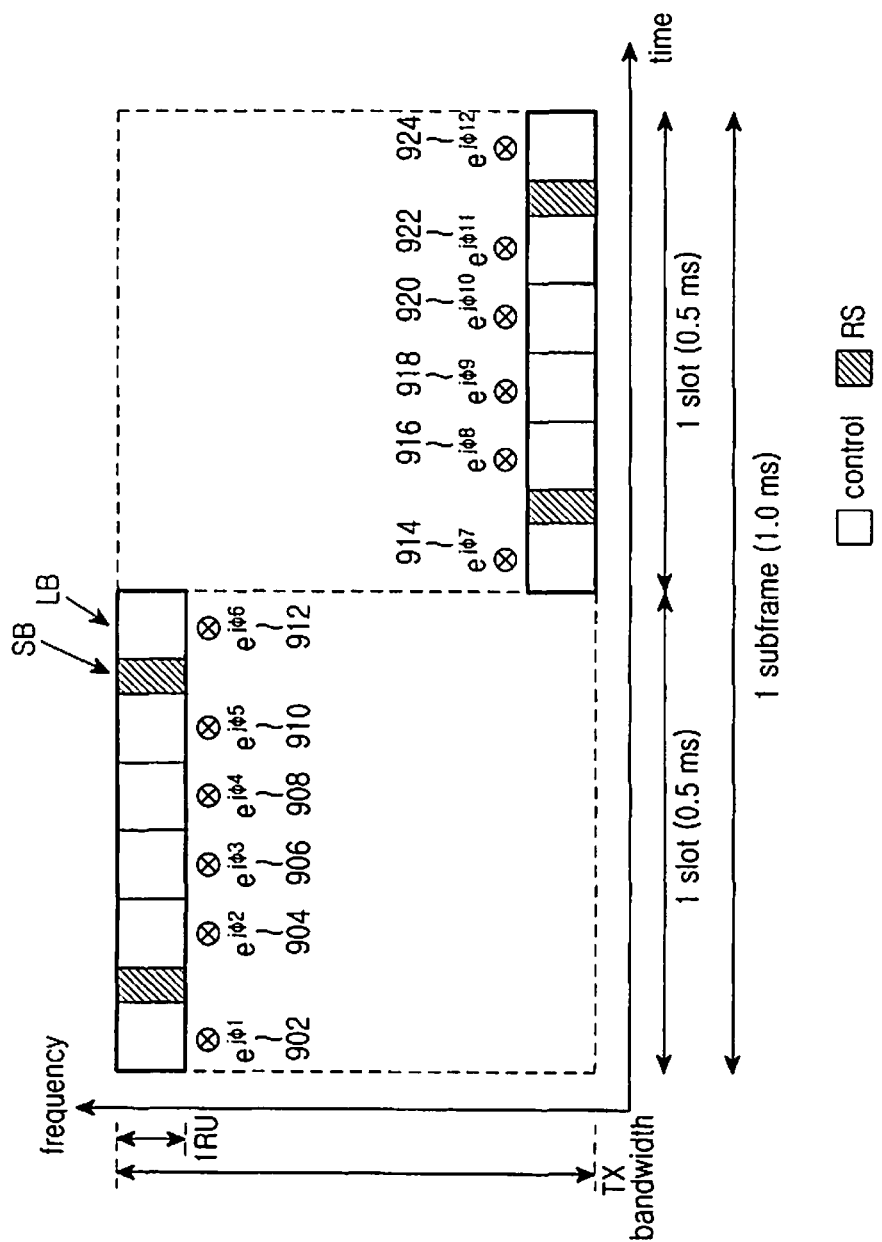
FIG. 9 illustrates another transmission mechanism for control information according to the present invention.

Referring to FIG. 9, one slot includes a total of 6 LBs and 2 SBs carrying a pilot signal. Hence, one subframe has 12 LBs in total, and 4 LBs are used for pilot transmission and 12 LBs for control information transmission. The same 1-bit control information occurs 6 times in each slot, thus 12 times in one subframe. For frequency diversity, frequency hopping is performed for the control information on a slot basis.

Figure 10A:
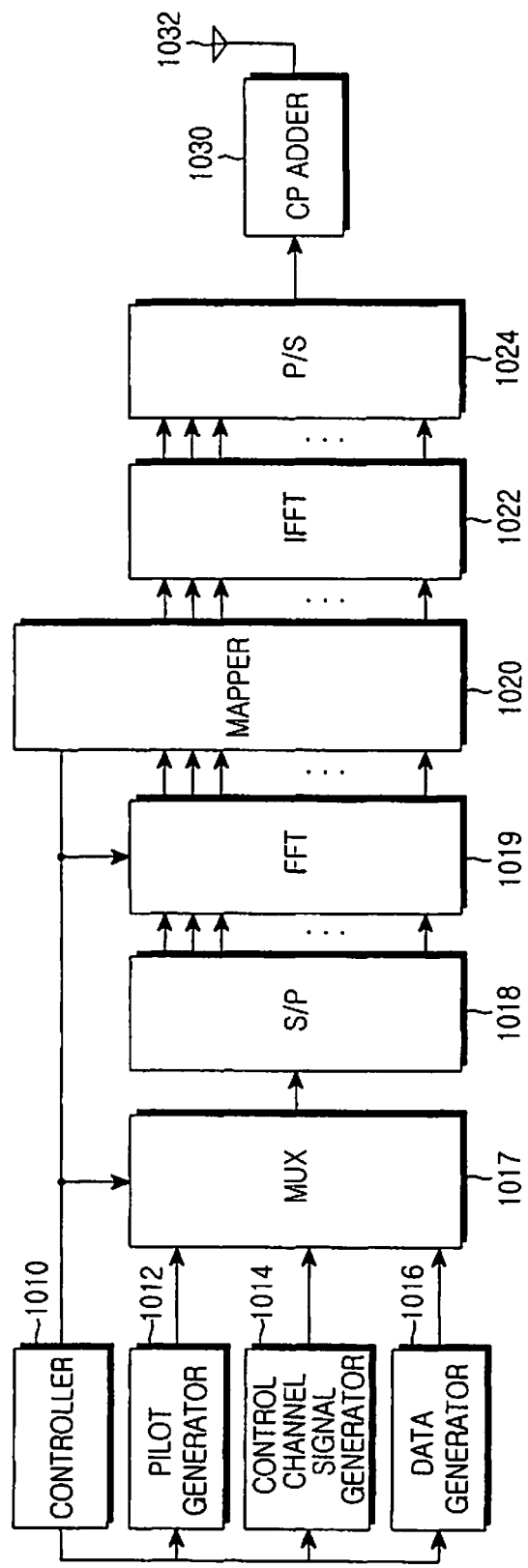
FIGS. 10A and 10B are block diagrams of a transmitter in the MS according to the present invention.

Referring to FIG. 10A, the transmitter includes a controller 1010, a pilot generator 1012, a control channel signal generator 1014, a data generator 1060, a MUX 1017, an S/P converter 1018, an FFT processor 1019, a mapper 1020, an IFFT 1022, a P/S converter 1024, a CP adder 1030, and an antenna 1032. Components and an operation related to UL data transmission are well known in the art and therefore, will not be described herein.

Controller 1010 provides overall control to the operation of the transmitter and generates control signals required for MUX 1017, FFT processor 1019, mapper 1020, pilot generator 1012, control channel signal generator 1014, and data generator 1016. A control signal provided to pilot generator 1012 indicates a sequence index indicating an allocated pilot sequence and a time-domain cyclic shift value, for pilot generation. Control signals associated with UL control information and data transmission are provided to control channel signal generator 1014 and data generator 1016.

MUX 1017 multiplexes a pilot signal, a data signal, and a control channel signal received from pilot generator 1012, data generator 1016, and control channel signal generator 1014 according to timing information indicated by a control signal received from controller 1010, for transmission in an LB or an SB. Mapper 1020 maps the multiplexed information to frequency resources according to LB/SB timing information and frequency allocation information received from controller 1010.

When only control information is transmitted without data, control channel signal generator 1014 generates a control channel signal by applying a ZC sequence randomized on an LB basis to control information in the afore-described method.

S/P converter 1018 converts the multiplexed signal from MUX 1017 to parallel signals and provides them to FFT processor 1019. The input/output size of FFT processor 1019 varies according to a control signal received from controller 1010. Mapper 1020 maps FFT signals from FFT processor 1019 to frequency resources. IFFT processor 1022 converts the mapped frequency signals to time signals and P/S converter 1024 serializes the time signals. CP adder 1030 adds a CP to the serial signal and transmits the CP-added signal through transmit antenna 1032.

Figure 10B:
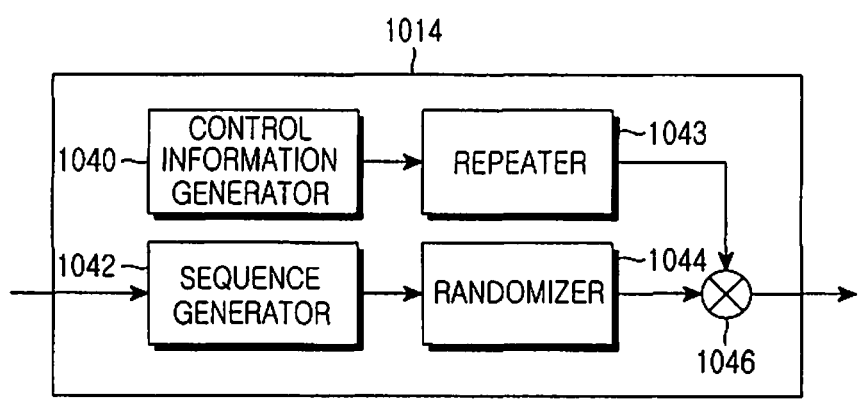

Referring to FIG. 10B, a sequence generator 1042 of control channel signal generator 1014 generates a code sequence, for example, a ZC sequence to be used for LBs. A randomizer 1044 generates a random phase value for each LB and multiplies the random phase value by the ZC sequence in each LB. To do so, sequence generator 1042 receives sequence information such as a sequence length and a sequence index from controller 1010 and randomizer 1044 receives random sequence information about the random phase value for each LB from controller 1010. Then, randomizer 1044 rotates the phase of the ZC sequence by the random phase value in each LB, thus randomizing the phase of the ZC sequence. The sequence information and the random sequence information are known to both the Node B and the UE.

A control information generator 1040 generates a modulation symbol having 1-bit control information and a repeater 1043 repeats the control symbol to produce as many control symbols as the number of LBs allocated to the control information. A multiplier 1046 CDM-multiplexes the control symbols by multiplying the control symbols by the randomized ZC sequence on an LB basis, thus producing a control channel signal.

Multiplier 1046 functions to randomize the symbols output from repeater 1043 by the randomized ZC sequence on a symbol basis. A modified embodiment of the present invention can be contemplated by replacing multiplier 1046 with a device that performs a function equivalent to applying or combining the randomized ZC sequence to or with the control symbols. For example, multiplier 1046 can be replaced with a phase rotator that changes the phases of the control symbols according to the phase values of the randomized ZC sequence, $\phi_m$ or $\Delta_m$.

Figure 11A:
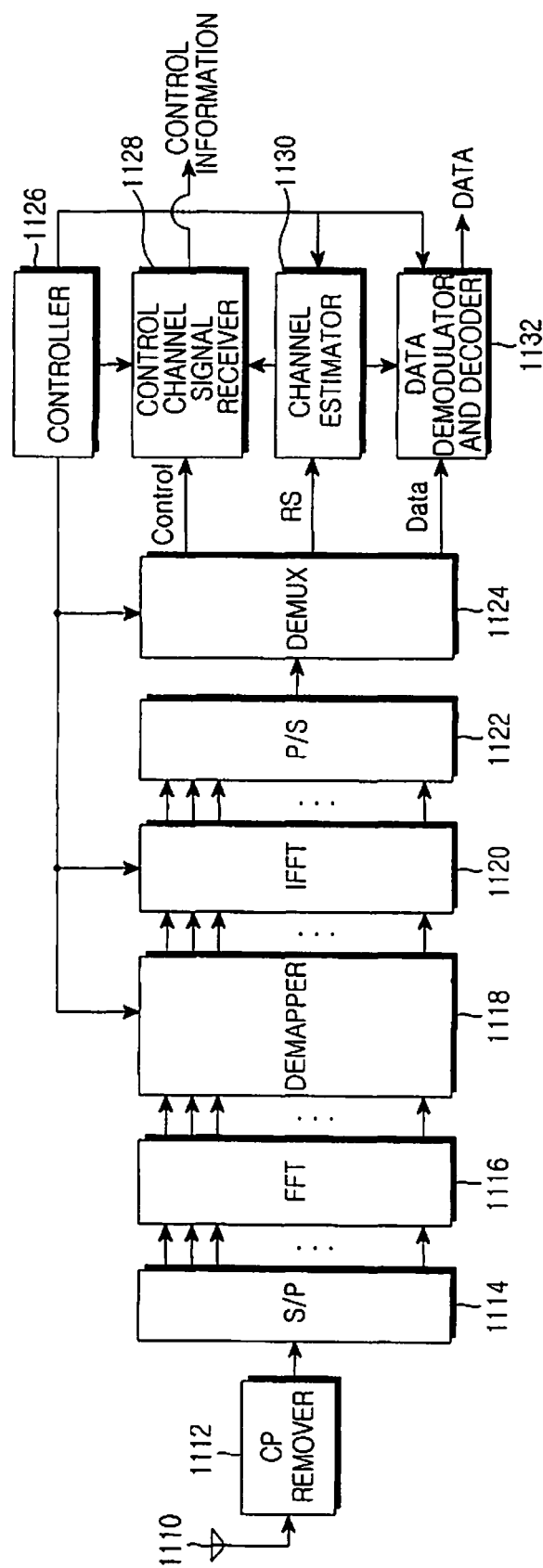
FIGS. 11A and 11B are block diagrams of a receiver in the Node B according the present invention.

Referring to FIG. 11A, the receiver includes an antenna 1110, a CP remover 1112, an S/P converter 1114, an FFT processor 1116, a demapper 1118, an IFFT processor 1120, a P/S converter 1122, a DEMUX 1124, a controller 1126, a control channel signal receiver 1128, a channel estimator 1130, and a data demodulator and decoder 1132. Components and an operation associated with UL data reception are well known in the art and therefore, will not be described herein.

Controller 1126 provides overall control to the operation of the receiver. It also generates control signals required for DEMUX 1124, IFFT processor 1120, demapper 1118, control channel signal receiver 1128, channel estimator 1130, and data demodulator and decoder 1132. Control signals related to UL control information and data are provided to control channel signal receiver 1128 and data demodulator and decoder 1132. A control signal indicating a sequence index indicating a pilot sequence allocated to the UE and a time-domain cyclic shift value is provided to channel estimator 1130. The sequence index and the time-domain cyclic shift value are used for pilot reception.

DEMUX 1124 demultiplexes a signal received from P/S converter 1122 into a control channel signal, a data signal, and a pilot signal according to timing information received from controller 1126. Demapper 1118 extracts those signals from frequency resources according to LB/SB timing information and frequency allocation information received from controller 1126.

Upon receipt of a signal including control information from the UE through antenna 1110, CP remover 1112 removes a CP from the received signal. S/P converter 1114 converts the CP-free signal to parallel signals and FFT processor 1116 processes the parallel signals by FFT. After processing in demapper 1118, the FFT signals are converted to time signals in IFFT processor 1120. P/S converter 1122 serializes the IFFT signals and DEMUX 1124 demultiplexes the serial signal into the control channel signal, the pilot signal, and the data signal.

Channel estimator 1130 acquires a channel estimate from the pilot signal received from DEMUX 1124. Control channel signal receiver 1128 channel-compensates the control channel signal received from DEMUX 1124 by the channel estimate and acquires the control information transmitted by the UE. Data demodulator and decoder 1132 channel-compensates the data signal received from DEMUX 1124 by the channel estimate and then acquires data transmitted by the UE based on the control information.

When only control information is transmitted without data on the UL, control channel signal receiver 1128 acquires the control information in the manner described with reference to FIGS. 8 and 9.

Figure 11B:
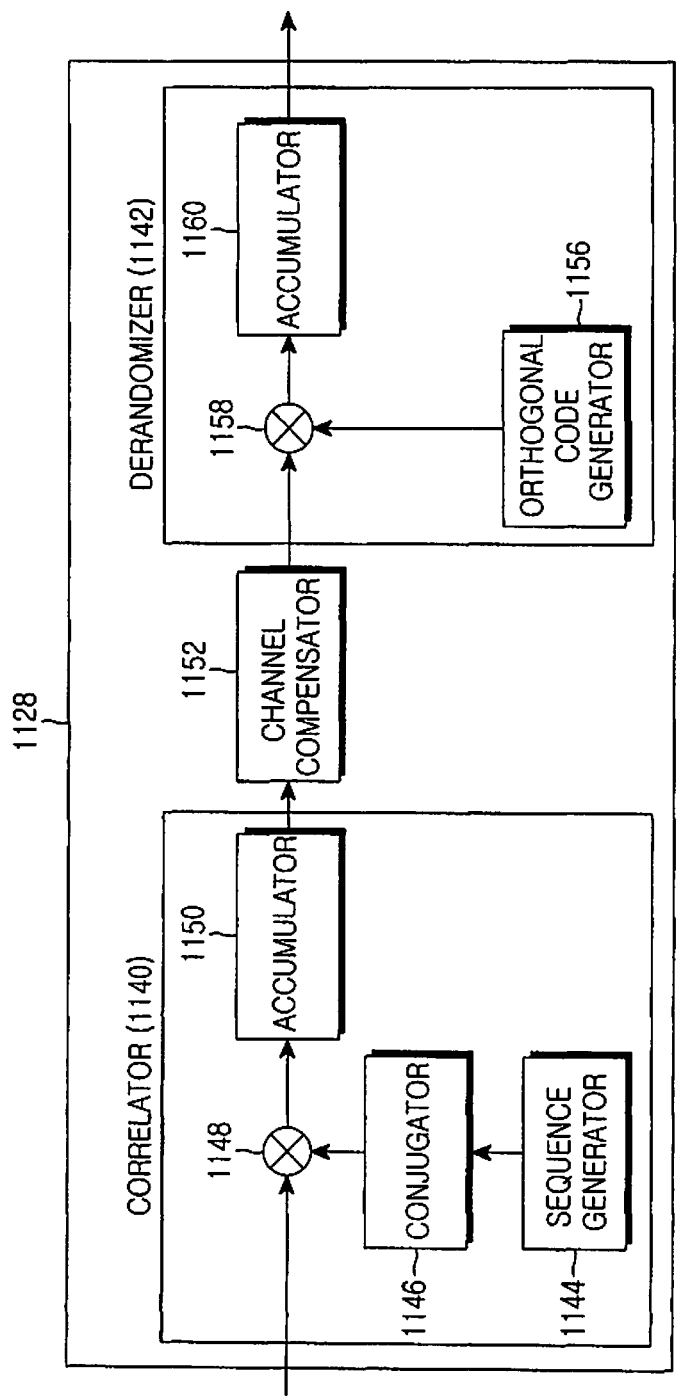

Referring to FIG. 11B, control channel signal receiver 1128 includes a correlator 1140 and a derandomizer 1142. A sequence generator 1144 of correlator 1140 generates a code sequence, for example, a ZC sequence used for the UE to generate control information. To do so, sequence generator 1144 receives sequence information indicating a sequence length and a sequence index from controller 1126. The sequence information is known to both the Node B and the UE.

A conjugator 1146 calculates the conjugate consequence of the ZC sequence. A multiplier 1148 CDM-demultiplexes the control channel signal received from DEMUX 1124 by multiplying the control channel signal by the conjugate sequence on an LB basis. An accumulator 1150 accumulates the product signal for the length of the ZC sequence. Multiplier 1148 of the correlator 1140 can be replaced with a phase rotator that changes the phases of the control channel signal on an LB basis according to the phase values $d_k$ of the sequence received from sequence generator 1144. A channel compensator 1152 channel-compensates the accumulated signal by the channel estimate received from channel estimator 1130.

In derandomizer 1142, a random value generator 1156 calculates the conjugate phase values of random phase values that the UE uses in transmitting the control information, according to random sequence information. A multiplier 1158 multiplies the channel-compensated signal by the conjugate phase values on an LB basis. Like multiplier 1046 of the transmitter, multiplier 1158 of derandomizer 1142 can be replaced with a phase rotator that changes the phases of the control channel signal on an LB basis according to the phase values $\phi_m$ or $\Delta_m$ of the random sequence received from sequence generator 1156.

An accumulator 1160 accumulates the signal received from multiplier 1158 for the number of LBs to which the 1-bit control information was repeatedly mapped, thereby acquiring the 1-bit control information. The random sequence information is signaled from the Node B to the UE so that both are aware of the random sequence information.

In a modified embodiment of the present invention, channel compensator 1152 is disposed between multiplier 1158 and accumulator 1160. While correlator 1140 and derandomizer 1142 are separately configured in FIG. 11B, sequence generator 1144 of correlator 1140 and random value generator 1156 of derandomizer 1142 can be incorporated into a single device depending on a configuration method. For example, if correlator 1140 is configured so that sequence generator 1144 generates a ZC sequence to which a random sequence is applied for each UE, multiplier 1158 and random value generator 1156 of derandomizer 1142 are not used. Thus, a device equivalent to that illustrated in FIG. 11B is achieved. In this case, like multiplier 1046 of the transmitter, multiplier 1148 of correlator 1140 can be replaced with a phase rotator that changes the phases of the control channel signal on a symbol basis according to the phase values ($d_k + \phi_m$) or ($d_k + \Delta_m$) of the sequence received from sequence generator 1144.

Setting a different phase value for each LB to each UE can further increase the inter-cell interference randomization. The Node B signals the phase value of each LB to each UE.

Aside from a random sequence as a phase sequence applied to 12 LBs carrying 1-bit control information, an orthogonal phase sequence such as a Fourier sequence can be used in the second exemplary embodiment of the present invention. A Fourier sequence of length N is defined as Equation (5):

$$f_k(n) = e^{-j\frac{2\pi k n}{N}}, \quad (5)$$
$$(n = 0, \ldots, N-1, k = 0, \ldots, N-1)$$

In Equation (5), a different cell-specific value k is set for each cell. When phase rotation is performed on an LB basis using a different Fourier sequence for each cell, there is no interference among cells if timing is synchronized among the cells.

The first and second exemplary embodiments can be implemented in combination. In the transmission mechanism of FIG. 5, LBs carrying 1-bit control information are multiplied by an orthogonal code and then by a random phase sequence. As the random phase sequence is cell-specific, the inter-cell interference is reduced.

Embodiment 3

The third exemplary embodiment of the present invention implements Method 3 described in Equation (4).

The time-domain cyclic shift value of a ZC sequence is cell-specific and changes in each LB that carries control information, thereby randomizing inter-cell interference. To be more specific, a cell-specific cyclic shift value $\Delta m$ applied to each LB is further applied in the time domain in addition to a cyclic shift value $d_k$ applied to each of control channels that are CDM-multiplexed in the same frequency resources within a cell. The Node B signals the cell-specific cyclic shift value to the UE. The cell-specific cyclic shift value is set to be larger than the maximum delay of a radio transmission path in order to keep the orthogonality of the ZC sequence.

To reduce the inter-cell interference, a cell-specific random time-domain cyclic shift value can also be applied to the pilot signal. The Node B signals the random time-domain cyclic shift value to the UE so that the random time-domain cyclic shift sequence is known to both the Node B and the UE.

Figure 12A:
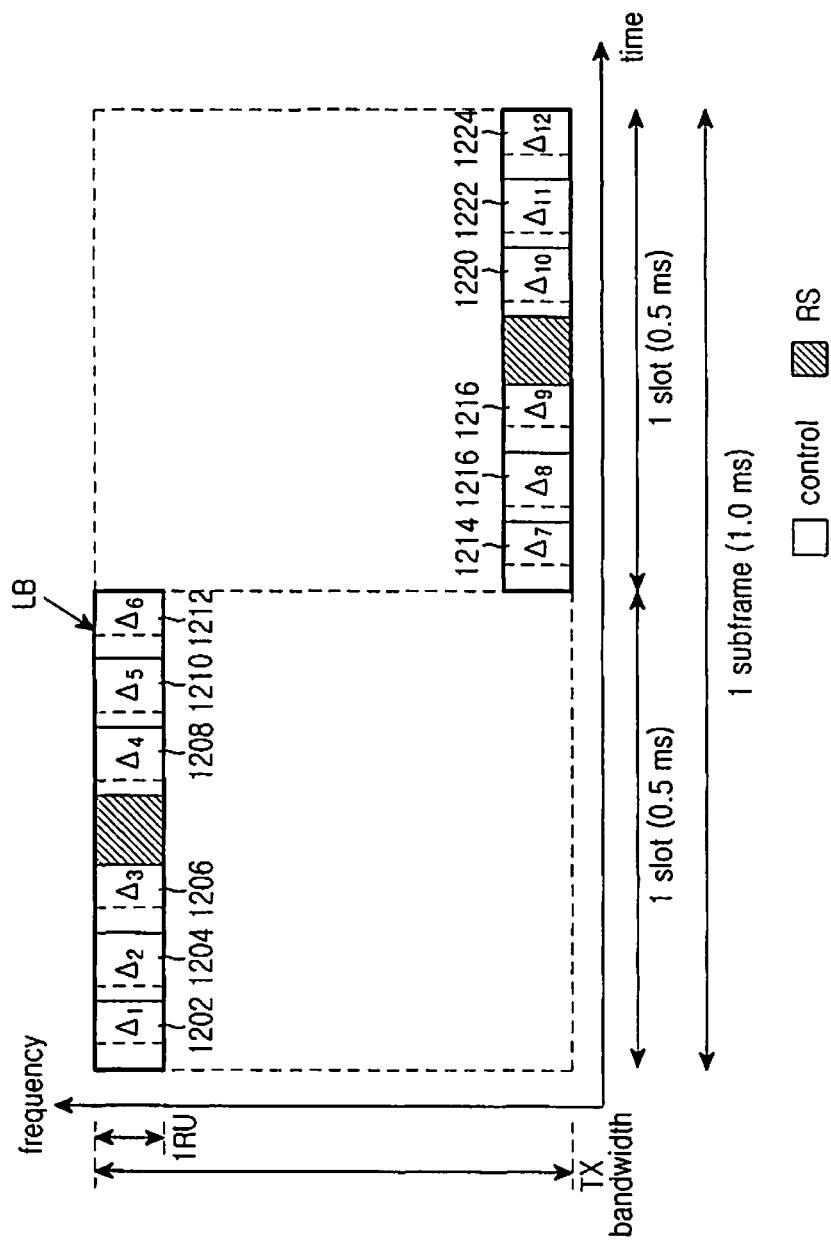
FIGS. 12A and 12B illustrate a transmission mechanism for control information according to the present invention.

Referring to FIG. 12A, one slot includes a total of 7 LBs and the fourth LB carries a pilot signal in each slot. Hence, one subframe has 14 LBs in total, and 2 LBs are used for pilot transmission and 12 LBs for control information transmission. While one RU is used for transmitting control information herein, a plurality of RUs can be used to support a plurality of users.

Random time-domain cyclic shift values applied to the 12 LBs of the ZC sequence are $\Delta_1, \Delta_2, \ldots, \Delta_2$ 1202 to 1224. The ZC sequence is cyclically shifted by the random time-domain cyclic shift values 1202 to 1224 on an LB basis to randomize the control information.

Figure 12B:
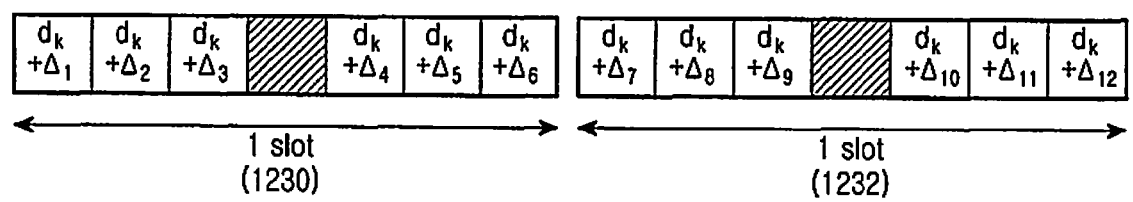

FIG. 12B is a detailed view of FIG. 12A. To CDM-multiplex different control channels within a cell, the same time-domain cyclic shift value $d_k$ (k is a control channel index) applies to each LB, and to randomize interference between control information from adjacent cells, different cell-specific time-domain cyclic shift values 1202 to 1224 apply to LBs. That is, the ZC sequence is additionally cyclically shifted by a time-domain cyclic shift value for each UE in the cell. Reference numerals 1230 and 1232 denote first and second slots, respectively in one subframe. For convenience' sake, frequency hopping is not shown.

When a UE-specific time-domain cyclic shift is used for additional randomization, the time-domain cyclic shift values 1202 to 1224 indicate a UE-specific random sequence and the combination of $d_k$ and the time-domain cyclic shift values 1202 to 1224 maintains orthogonality among the control channels within the same cell.

Figure 13:
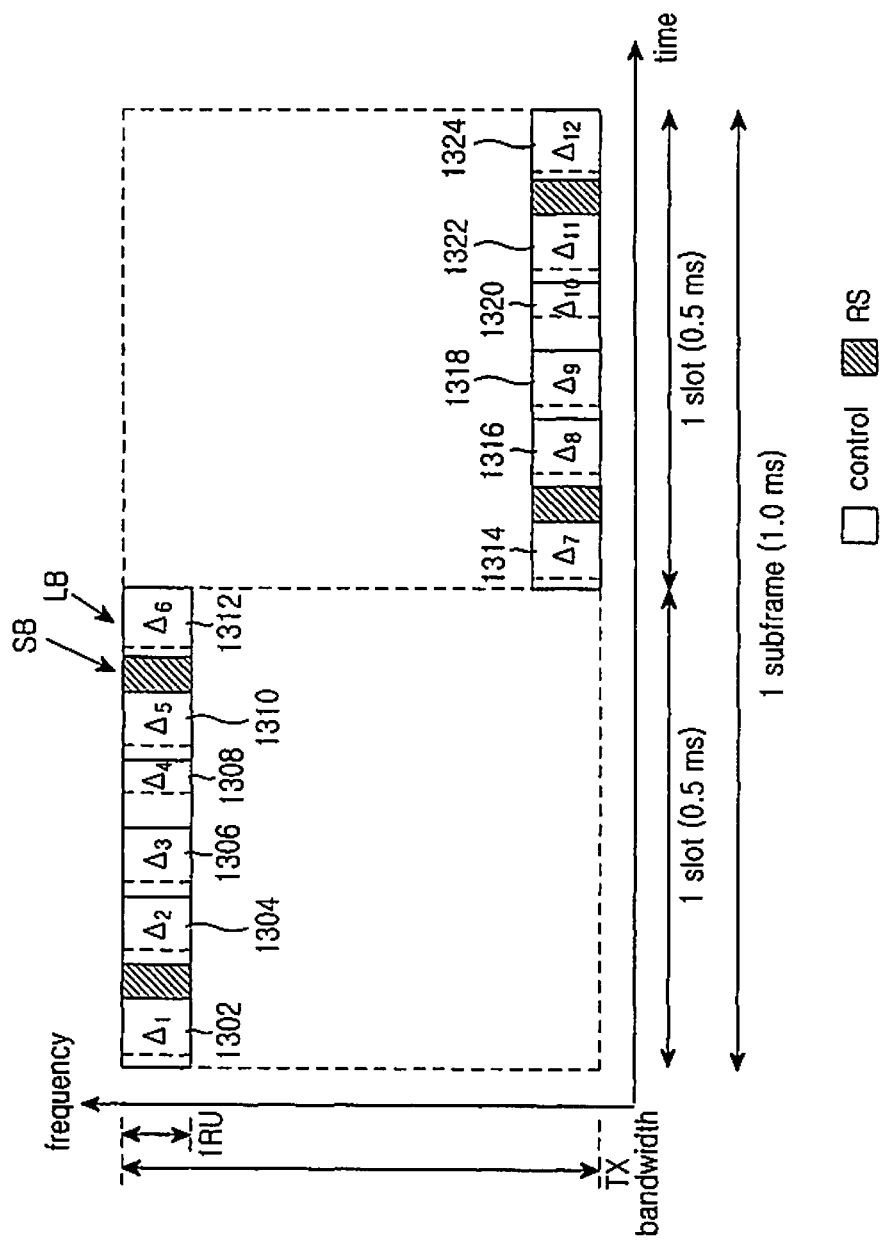
FIG. 13 illustrates another transmission mechanism for control information according to the present invention.

FIG. 13 illustrates another transmission mechanism for control information according to the third exemplary embodiment of the present invention. Time-domain cyclic shift values of a ZC sequence for 12 LBs are $\Delta_1, \Delta_2, \ldots, \Delta_2$ 1302 and 1324. The ZC sequence is cyclically shifted in each LB by a time-domain cyclic shift value in order to randomize control information.

A transmitter and a receiver according to the third exemplary embodiment of the present invention are identical in configuration to those illustrated in FIGS. 10A and 10B and FIGS. 11A and 11B, except that the randomizer 1044 illustrated in FIG. 10B randomizes a ZC sequence with random time-domain cyclic shifts on an LB basis and the random value generator 1156 illustrated in FIG. 11B calculates the conjugate phase value of the random time-domain cyclic shift value of each LB and provides it to the multiplier 1158.

The first and third exemplary embodiments can be implemented in combination. That is, in the transmission mechanism of FIG. 5, control information is multiplied by an orthogonal code, and then additionally by a random cyclic shift sequence on an LB basis as illustrated in FIG. 12 or FIG. 13. As the random cyclic shift sequence is different for each cell, the inter-cell interference is reduced.

As is apparent from the above description, the present invention advantageously reduces inter-cell interference by applying a random phase or a cyclic shift value to each block on a cell basis or on a UE basis, when UL control information from different users is multiplexed in a future-generation multi-cell mobile communication system.

While the invention has been shown and described with reference to certain exemplary embodiments of the present invention thereof, they are mere exemplary applications. For example, the exemplary embodiments of the present invention are applicable to control information with a plurality of bits such as a CQI as well as 1-bit control information. Also, a random value for a code sequence used for control information can be applied in a predetermined resource block basis as well as on an LB basis. Thus, it will be understood by those skilled in the art that various changes in form and details may be made therein without departing from the spirit and scope of the present invention as further defined by the appended claims and their equivalents.

What is claimed is:

1. A method for transmitting information, the method comprising:
   obtaining, by a User Equipment (UE), a sequence based on a Zadoff-Chu sequence and $e^{j\alpha}$, where a cyclic shift value $\alpha$ is defined per Single Carrier-Frequency Division Multiple Access (SC-FDMA) symbol;
   generating, by the UE, a signal using information and the sequence; and
   transmitting, by the UE, the signal in a SC-FDMA symbol to a Node B.

2. The method of claim 1, wherein the sequence is defined based on multiplying the Zadoff-Chu sequence and the $e^{j\alpha}$.

3. The method of claim 1, wherein the signal is defined based on multiplying the sequence and the information.

4. The method of claim 1, wherein the SC-FDMA symbol is predefined among a plurality of SC-FDMA symbols in a slot of a subframe.

5. The method of claim 4, wherein the signal is transmitted by frequency hopping between two slots of the subframe.

6. A method for receiving information, the method comprising:
   receiving, by a Node B, a signal in a Single Carrier-Frequency Division Multiple Access (SC-FDMA) symbol from a User Equipment (UE);
   determining, by the Node B, a Zadoff-Chu sequence and $e^{j\alpha}$, where a cyclic shift value $\alpha$ is defined per SC-FDMA symbol;
   obtaining, by the Node B, a sequence based on the Zadoff-Chu sequence, $e^{j\alpha}$, and the cyclic shift value $\alpha$; and
   obtaining, by the Node B, the signal using the sequence.

7. The method of claim 6, wherein the sequence is defined based on multiplying the Zadoff-Chu sequence and the $e^{j\alpha}$.

8. The method of claim 6, wherein the signal is defined based on multiplying the sequence and the information.

9. The method of claim 6, wherein the SC-FDMA symbol is predefined among a plurality of SC-FDMA symbols in a slot of a subframe.

10. The method of claim 9, wherein the signal is received by frequency hopping between two slots of the subframe.

11. An apparatus for transmitting information, the apparatus comprising:
    a controller configured to obtain a sequence based on a Zadoff-Chu sequence and $e^{j\alpha}$, where a cyclic shift value $\alpha$ is defined per Single Carrier-Frequency Division Multiple Access (SC-FDMA) symbol, and to generate a signal using information and the sequence; and
    a transceiver configured to transmit signal in a SC-FDMA symbol to a Node B.

12. The apparatus of claim 11, wherein the sequence is defined based on multiplying the Zadoff-Chu sequence and the $e^{j\alpha}$.

13. The apparatus of claim 11, wherein the signal is defined based on multiplying the sequence and the information.

14. The apparatus of claim 11, wherein the SC-FDMA symbol is predefined among a plurality of SC-FDMA symbols in a slot of a subframe.

15. The apparatus of claim 14, wherein the signal is transmitted by frequency hopping between two slots of the subframe.

16. An apparatus for receiving information, the apparatus comprising:
- a transceiver configured to receive a signal in a Single Carrier-Frequency Division Multiple Access (SC-FDMA) symbol from a User Equipment (UE); and
- a controller configured to determine a Zadoff-Chu sequence and $e^{j\alpha}$, where a cyclic shift value $\alpha$ is defined per SC-FDMA symbol, to obtain a sequence based on the Zadoff-Chu sequence, $e^{j\alpha}$, and the cyclic shift value $\alpha$, and to obtain the signal using the sequence.

17. The apparatus of claim 16, wherein the sequence is defined based on multiplying the Zadoff-Chu sequence and the $e^{j\alpha}$.

18. The apparatus of claim 16, wherein the signal is defined based on multiplying the sequence and the information.

19. The apparatus of claim 16, wherein the SC-FDMA symbol is predefined among a plurality of SC-FDMA symbols in a slot of a subframe.

20. The apparatus of claim 19, wherein the signal is received by frequency hopping between two slots of the subframe.

* * * * *